C. SPITZ.
ROASTING PAN.
APPLICATION FILED JUNE 2, 1919.
1,349,302.
Patented Aug. 10, 1920.
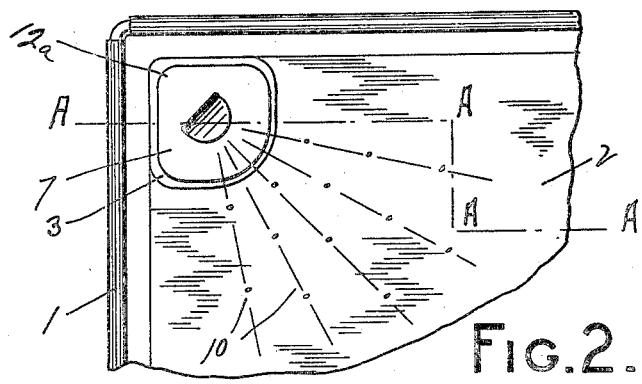
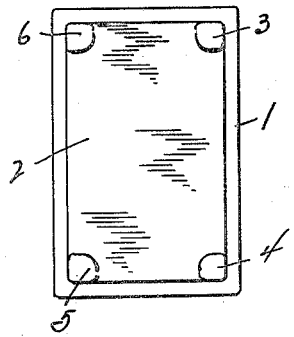
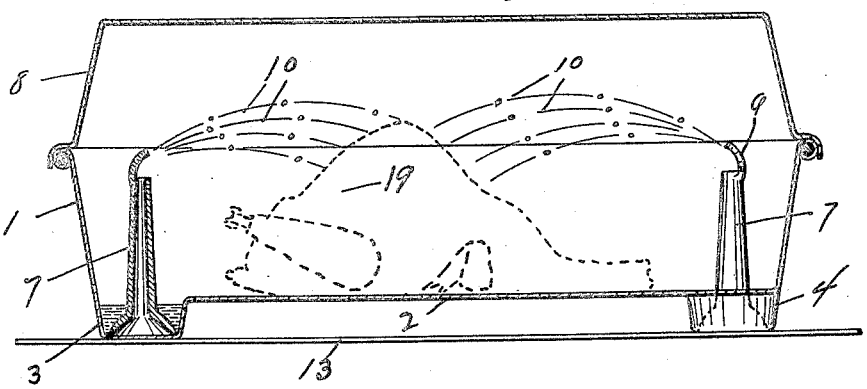
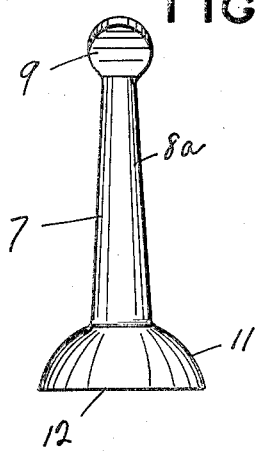
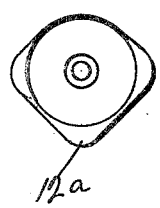
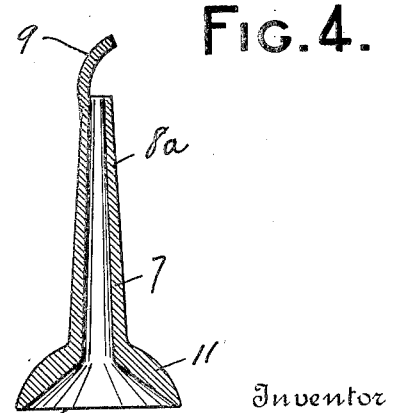
Inventor
Charles Spitz.
By his Attorney
Thomas Veitch

UNITED STATES PATENT OFFICE.

CHARLES SPITZ, OF NEW YORK, N. Y.

ROASTING-PAN.

1,349,302.  Specification of Letters Patent.  Patented Aug. 10, 1920.

Application filed June 2, 1919.  Serial No. 301,135.

*To all whom it may concern:*

Be it known that I, CHARLES SPITZ, a citizen of the United States, and a resident of 91 William street, New York city, in the county of New York and State of New York, have invented certain new and useful Roasting-Pans, of which the following is a specification.

My invention relates to roasting pans and particularly to the type known as self-basting, wherein the ebullition of the liquids or gravy cause them to be automatically sprayed over the viands in the pan.

It is well known that the flavor and proper roasting of meats of all variety is dependent upon a continuous basting of the same while in the process of cooking. The oldest and most generally used means to this day, is the hand basting with a spoon; a disagreeable recurring operation always fraught with the possibility of scalding and burns from the hot grease and the equally hot oven. Many attempts have been made to overcome the necessity of hand basting such as by covering the pan, by providing percolating devices to raise the meat juices also by using pumps or buckets driven by clockwork or otherwise.

The covered pan alone does not provide a true basting but only a steam moistened atmosphere around the roast and this being under no pressure is not above 212° Fahrenheit; practically boiling the viand in the pan and preventing the formation of the seared crust essential to the retention of the flavoring juices within the roast. The other devices mentioned provide a true basting but are objectionable for the following reasons. The percolating self-basting pans of American and British invention show percolating devices that require deep gravy wells to secure the needed water seal to operate the percolator. This fact alone would militate against the general adoption of these pans as they would not enter most ovens. Another objection to the above mentioned pans is that they use perforated pipes or multiple nozzles to distribute the gravy over the roast and these will quickly clog up with particles of browned fat, etc., rendering them inoperative. Then again these nozzles and long percolator pipes are difficult to clean.

The objects of my invention are to obviate the objectionable features of all other self-basting roasting pans by producing a pan that will fit any oven; that has a simple basting device with a short straight pipe, therefore easily cleaned; that has a one piece non-clogging spreader preferably integral with the basting device; that has low smooth easily cleaned gravy wells; that is no larger than the plain non-basting pan; that will serve as a warming pan or steam table after the roasting is finished without raising the temperature above 212° Fahrenheit and without drying the roast.

The objects of my invention set forth above with others that will appear, and the particular means of attaining these are now to be described and are illustrated in the accompanying drawing forming part of this specification.

Similar characters of reference denote like or corresponding parts throughout the several views; of which Figure 1 is a vertical longitudinal section of my complete invention on the line A—A—A—A of Fig. 2 which is a plan view of one corner of my roasting pan; Fig. 3 is a bottom view showing the gravy wells projecting from the pan bottom; Fig. 4 is a section of my spraying funnel or basting device; Fig. 5 is a front elevation and Fig. 6 a bottom view of the same.

Referring to Fig. 1 of the drawings, numeral 1 represents a metal pan, in the bottom 2 of said pan and at the corners are located four shallow wells or depressions 3, 4, 5 and 6. These are to collect the gravy or meat juices and being small (about three fourths of an inch in depth by about an inch across) do not detract from the capacity of the pan. In the bottom of these wells stand the basting devices 7. These are shown about full size in Figs. 4, 5 and 6 and will hereafter be more fully described. The pan 1 is preferably provided with a cover 8 but will operate without it. The gravy or juices drain into the wells and are sprayed or ejected upon the roast viand shown in dotted outline at 19. The path of the basting liquid being shown by the lines and dots 10.

The basting device as shown in Figs 4, 5 and 6 is an inverted funnel shaped structure 7 preferably cast from iron or other metal to give weight and comprising a hollow stem $8^a$, and a flattened cone shape bowl 11 the lower edge 12 of which is smooth and even to form a seal with the surface upon which it is resting as the smooth bottom of the gravy wells. This fairly close fitting joint combined with the weight of the basting device and the low height of its bowl 11 will cause the device to eject liquid from its stem 8$^a$ as soon as the level reaches a depth of about one eighth of an inch in the wells. Another important feature of the device 7 is the non-clogging spreader lip 9 which is preferably cast integral with the stem 8$^a$. This spreader serves to distribute the efflux of liquid by breaking it up into small drops and spreading and directing these to reach practically all parts of the roast. It will be readily seen that my invention will baste with constantly recurring ejections and with a minimum of liquid in the pan; that the basting devices take up but small space in the normally unoccupied corners of the roasting pan; that they require but a small increase in the height of the pan for the shallow wells; that they are simple and cheap to make and that with their short straight stems and open structure they may be readily cleaned after using. This latter is of prime importance in fact it is as equally essential as the correct operation of the devices. The wells are shallow and have rounded corners so they furnish no bar to cleanliness, another important feature. To insure the basting devices being properly placed in the wells so as to direct the gravy toward the center of the pan, the outside of the bowl 11 is shaped so that the rounded apex 12$^a$ fits into the corner of the well, the latter being of approximately triangular outline.

A further use of my invention is to keep the roasted meat hot and moist by placing the pan upon the coal range or upon a plate 13 over a gas range. The bottom of the pan 2 is above the heated surface with only the bottoms of the wells in contact therewith, so while the liquid in the wells will boil and the basting devices operate the roast will not cook further and may be kept hot and palatable almost indefinitely. Still another important feature of my invention is the small capacity of the wells needed to operate the basting devices thus permitting a small roast to be cooked in the pan without requiring a large dilute quantity of gravy. Even with a large roast a small amount of highly flavored basting liquid will materially improve the flavor and avoid its boiling in the gravy.

The objectionable features of self-basting pans are inherent in the basting pans of this art such as in the United States patent to Williams 814,255 of 1906 and Schaefer 910,318 of 1909 and the British to Cole 15,370 of 1895 and Cole 15,877 of 1901. It is therefore not strange to find that self-basting pans with the features of these inventions and others are not offered for sale and that there is apparently no demand for them.

Having thus fully illustrated and described my invention so that anyone skilled in the art may make and construct the same and not limiting myself to the definite arrangement and construction of parts as shown; I claim;

1. In a self-basting roasting pan, a basting device of imperforate inverted funnel shape having a bottom edge adapted to make sealing contact with the surface on which it rests.

2. A self-basting roasting pan, comprising a pan provided with a gravy well, and an imperforate inverted funnel-shaped basting device arranged in the well and having sealing contact with the bottom thereof; for the purpose set forth.

3. A self-basting roasting pan, comprising a pan provided with a plurality of gravy wells adapted to serve as feet for the pan, and imperforate inverted funnel-shaped basting devices arranged in the gravy wells and having sealing contact with the bottoms thereof; for the purpose set forth.

4. A self-basting roasting pan, comprising a pan provided with a gravy-well, and an imperforate inverted funnel-shaped basting device standing in the well and having its bottom edge adapted for sealing contact with the bottom of the well, the basting device being of substantial weight to maintain said sealing contact; for the purpose set forth.

5. A self-basting roasting pan, comprising a pan provided with a gravy-well, and a basting device comprising an imperforate inverted funnel-shaped element arranged in the well, having sealing contact with the bottom of the well and having at its top a spreader adapted to break up the ejected liquid into drops and direct the same upon the contents of the pan.

6. A self-basting roasting pan having gravy wells disposed in the corners thereof a funnel shaped basting device provided with a smooth supporting edge for standing in each well and comprising a low flat cone shaped bowl with a short straight stem rising from the apex thereof, a spreader attached to the upper end of the stem and adapted to deflect the liquid ejected from the stem and cause the said liquid to separate into small globules and impinge upon the contents of the pan.

7. A self-basting roasting pan having gravy wells disposed in the corners thereof, inverted funnel shaped basting devices provided with a smooth supporting edge for standing in the wells, a spreader comprising a curved surface secured to the stem of the basting device for effecting a breaking up of the ejected basting liquid into many drops and for a deflection of these drops upon the contents of the pan.

8. A self-basting roasting pan having gravy wells disposed in the corners thereof, inverted funnel shaped basting devices provided with a smooth supporting edge for standing in the wells, a spreader comprising a disk curved in one plane and adapted to break up the ejected basting liquid into many drops and to direct these drops upon the contents of the pan.

Signed at New York city, in the county of New York and State of New York this 29th day of May, A. D. 1919.

CHARLES SPITZ.

Witness:
HENRY L. PEREZ.